United States Patent
Watkins, Jr. et al.

(10) Patent No.: US 6,399,136 B1
(45) Date of Patent: Jun. 4, 2002

(54) COFFEE CONCENTRATE

(76) Inventors: Arthur W. Watkins, Jr.; Elaine T. Watkins, both of 6308 Mitchell Mill Rd., Zebulon, NC (US) 27597

( * ) Notice: Subject to any disclaimer, the term of this patent is extended or adjusted under 35 U.S.C. 154(b) by 0 days.

(21) Appl. No.: 09/605,591

(22) Filed: Jun. 28, 2000

Related U.S. Application Data

(60) Provisional application No. 60/140,832, filed on Jun. 28, 1999.

(51) Int. Cl.[7] ............................... A23F 5/00; A23F 5/24
(52) U.S. Cl. ....................................... 426/594; 426/521
(58) Field of Search ................................... 426/594, 521

(56) References Cited

U.S. PATENT DOCUMENTS

| | | | |
|---|---|---|---|
| 228,889 A | 6/1880 | Gue et al. | |
| 1,393,045 A | 10/1921 | Scott | |
| 2,497,721 A | 2/1950 | Foukes | 99/152 |
| 3,830,940 A | 8/1974 | Sivetz | |
| 4,618,500 A | 10/1986 | Forquer | 426/433 |
| 4,980,182 A | * 12/1990 | Kwon et al. | |
| 4,983,408 A | 1/1991 | Colton | 426/45 |
| 5,384,143 A | * 1/1995 | Koyama et al. | |
| 5,637,343 A | 6/1997 | Ryan | 426/594 |

FOREIGN PATENT DOCUMENTS

JP         10-304823         * 11/1998

* cited by examiner

Primary Examiner—Anthony J. Weier
(74) Attorney, Agent, or Firm—Mills Law Firm PLLC

(57) ABSTRACT

A coffee concentrate shelf stable for extended periods at ambient temperatures includes an aseptically packaged coffee concentrate of coffee and water obtained through a cold extraction process and processed under ultra high temperature and time conditions having an $F_0$ value in the range of about 1 to 12.

8 Claims, 1 Drawing Sheet

COFFEE CONCENTRATE

RELATED APPLICATION

This application claims the benefit under 35 USC 119 of U.S. Provisional Application No. 60/140,832, filed on Jun. 28, 1999 in the name of Arthur W. Watkins, Jr. et al. and entitled "Coffee Concentrate".

FIELD OF THE INVENTION

This invention relates to coffee concentrates, and in particular, to a liquid coffee concentrate that is processed and packaged under aseptic conditions to produce a high-quality and shelf-stable concentrate derived from a cold temperature extraction process.

BACKGROUND OF THE INVENTION

The brewing of coffee using only coffee beans and water is an art practiced through the world. While many different coffee beans, roasting and grinding techniques, bean/water ratios may be used based on regional and cultural preferences, the basic hot extraction method remains similar. Therein, the bean in desired form is exposed at an elevated temperature for a period of time sufficient to extract the desired constituents for the taste of the end consumer. Against such background, it is widely accepted that excessive brewing temperature can adversely affect the palatability of the resulting brew. Similarly, insufficient brewing temperature results in insufficient extraction and an undesirably weak brew. Further, it is widely accepted that reheating a properly brewed coffee to excessive temperatures can also adversely affect the desired taste. Accordingly, notwithstanding advances in automatic equipment available to the consumer, brewing a highly palatable coffee remains an elusive challenge.

Recently, in addition to regularly brewed coffee, specialized coffee drinks have become popular. Mocha, espresso, cafe latte, cappuccino and the like require brewing techniques not readily and reliably practiced in the consumer setting, and accordingly are available primarily only at commercial settings having specialized equipment and personnel for such products. Also, cold coffees are becoming popular and require a non-bitter coffee concentrate that will maintain desired flavor in the presence of dilution with ice and additives.

In an effort to provide the consumer and the commercial establishment with a wide variety of hot and cold coffee based beverages that can be reliably and repetitively served without specialized equipment, an effort has been made to provide coffee concentrates that can be heated, diluted, cooled, processed and formulated for such applications. However, the basic constituents of coffee have prevented acceptably shelf-stable products from being successfully developed. Coffees, unlike many food and beverage concentrates, deteriorate in unacceptable ways due to enzymatic and bacterial degradation. While such reactions can be retarded through refrigeration, such storage is expensive and effective for limited time periods and compromised unless completely utilized at first consumption, inasmuch as the temperature transients in handling outside the refrigerated setting can accelerate and resume the undesired reactions. Such limitations also reduce the availability and increase the cost of such products to the consumer inasmuch as refrigerated shelf space is expensive in storage or retail facilities. Further, conventional processing and packing techniques have not provided a satisfactory solution. Coffee is an exceedingly complex liquid of aromatics, oils and other flavor and texture enhancing entities contributing to the recognized taste criteria of acidity, body, aroma, flavor and essence. These qualities by presence or absence determine quality and acceptability of the brewed coffee to the consumer.

As to processing, proper extraction is required under controlled time and temperature conditions. Excessive brewing temperature results in excess acidity and off-taste characteristics and, accordingly, experienced brewers and packagers go to great lengths to avoid excessive temperatures. As to packaging, the efforts to provide refrigerated or non-refrigerated shelf life to coffee and coffee concentrates while retaining the desirable taste criteria are in processing conflict. Thermal processing for reducing bacterial and microbial constituents when successful does so at the expense of flavor loss. Undesirable changes in the qualities resulting from reaction between the coffee constituents. Merely providing elevated high processing temperatures has not produced satisfactory product.

One such prior art approach as disclosed in U.S. Pat. No. 228,889 to Gue et al. wherein separate cold and hot extracts are obtained for appropriate dilution at time of use. Therein, it is recognized air exposure is detrimental. Additives are incorporated to avoid the loss of desirable coffee qualities.

U.S. Pat. No. 4,983,408 to Colton discloses obtaining an extract by contacting an aqueous mixture of coffee with pressurized steam followed by enzyme treatment to produce a concentrate that may be reconstituted or converted to a soluble solid. No ambient temperature shelf life it attributed to the resultant product.

U.S. Pat. No. 1,393,045 to Scott discloses a heat exchange evaporation to produce a coffee concentrate without any process provisions for attaining ambient shelf life.

U.S. Pat. No. 3,860,940 to Sivetz discloses a process of hot water injection into a column containing coffee thereby producing a concentrated coffee vapor phase that is liquefied and packaged. No process provisions are incorporated for eliminating enzyme or bacterial degradation in the concentrate.

U.S. Pat. No. 2,497,721 to Foulkes discloses a high temperature extraction to which sodium phosphate and propylene glycol are added as stabilizers. Flash pasteurization or post packaging high temperature sterilization are employed to increase shelf life. The suggested temperature and processing conditions are not currently regarded as appropriate.

U.S. Pat. No. 4,618,500 to Forquer discloses a method for producing espresso-type coffee using low temperature and pressure brewing to form a concentrate followed by low temperature cooling for producing a product suitable for storage under refrigerated conditions.

U.S. Pat. No. 5,637,343 to Ryan discloses an ambient temperature extraction for forming a concentrated followed by microfiltration for removing bacteria from the process water and concentrate for enabling non-refrigerated storage. No post extraction procedures are employed for removing non-filterable pathogenic material.

From the foregoing, it will be apparent that the prior art has sought through many routes to provide a stable concentrate, but in the process has introduced excessive temperatures for extraction or thermal treatment now known to be incompatible with consumer preferred tastes, required chemical additives not favored by consumers, only partially removed pathogenic material contributing to taste degradation, or required expensive refrigerated storage prior to sale or use.

Thusly, a well established need continues to exist for a packaged coffee product, in concentrated or dilute form, having extended storage life at ambient temperatures that retains full flavor without diminution over time and may be formulated with ordinary equipment and techniques into a wide menu of popular coffee formats.

Accordingly, it is an object of the present invention to provide an extended shelf life coffee product retaining the flavor characteristics of freshly brewed product.

Another object of the invention is to provide a process for packaging coffee concentrate for long term storage under non-refrigerated conditions without a loss of desirable taste characteristics.

A further object of the invention is to provide an aseptically packaged coffee having extended ambient temperature storage without the use of chemical additives.

Yet another object of the invention is to provide a packaged liquid coffee that is shelf-stable for extended periods at ambient temperatures and does not contain undesirable flavoring when processed for consumption.

BRIEF SUMMARY OF THE INVENTION

The foregoing objects and features are provided in accordance with the present invention by a coffee concentrate extracted, processed and packaged under time, temperature and pressure conditions effective for reducing microbial content sufficient for long term ambient storage and producing a coffee product having all desirable flavor characteristics of freshly brewed coffee consumables. More particularly, coffee beans and non-processed water, only, are admixed under ambient conditions for a period of time to achieve a desired extraction of the desired coffee constituents, either in concentrated or diluted form. The coffee extraction is then processed at elevated temperature and for a time and under pressure sufficient to reduce microbial content to a level by which the content may be aseptically packaged to produce a product that can be stored for extended periods without refrigeration, and when consumed either in coffee drinks directly based on the concentrate strength or diluted appropriately for regular coffee products produces acidity, body, aroma, flavor and essence associated by coffee consumers with a freshly brewed product. The previously experienced untoward results of elevated temperatures, required for acceptable microbial reduction, have been found to be tolerated by processing the concentrate at time and temperature conditions having an $F_0$ value in the range of 1.0 to 12.0 under moderate pressure conditions. After such processing the thermally treated concentrate is rapidly cooled and processed under conventional aseptic packaging techniques. When consumed, at concentrate strength or diluted strength, after ambient storage, the desired characteristics are retained.

DESCRIPTION OF THE DRAWINGS

The above and other objects features and advantages of the present invention will become apparent upon reading the following detailed description taken in conjunction with the accompanying drawing in which.

DETAILED DESCRIPTION OF THE PREFERRED EMBODIMENTS

Figure 1:
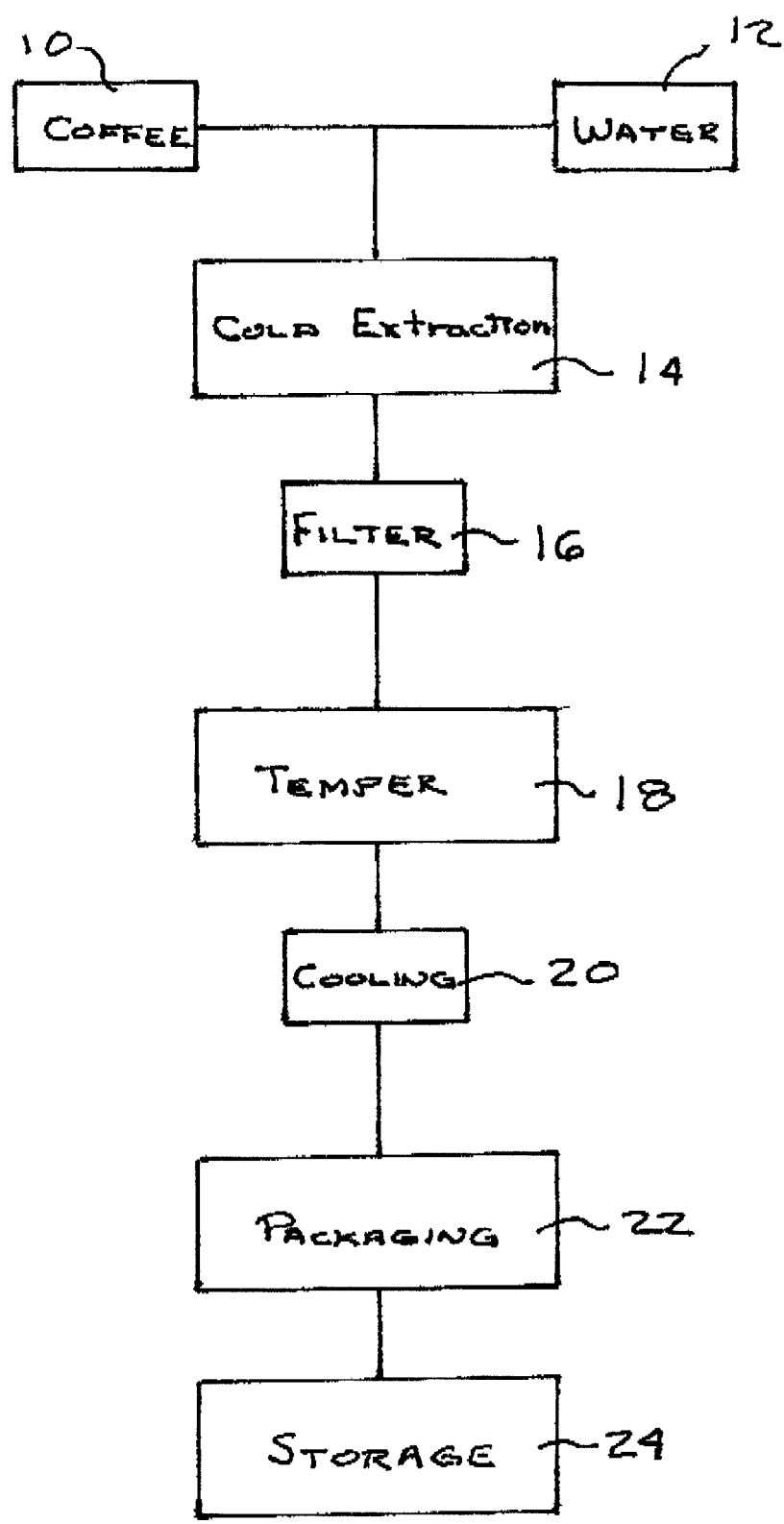
FIG. 1 is a block diagram for the process for making a coffee concentrate in accordance with the present invention.

Referring to the drawings for the purpose of illustrating a preferred embodiment of the invention and not for limiting same, FIG. 1 shows a process 10 for extracting, treating, packaging and storing a coffee concentrate providing extended shelf life under ambient conditions and retaining the full flavor characteristics of comparable freshly brewed coffee. Therein, the process 10 combines formulated amounts of ground coffee 12 and process water 14 for cold extraction 16. After cold extraction, the extract is passed through a filter 18. The filtered extract may be diluted and/or transferred to heat treatment 20 for temperature, time and pressure processing and thereafter to cooling 22 for lowering the temperature prior to packaging 24. Thereafter, the cooled product is routed to storage 26 at ambient conditions.

For the cold extraction, coffee beans, roasted and ground in accordance with the coffee product desired, are mixed with process water in an appropriate reservoir for extraction under typical ambient conditions in the range of 60° F. to 90° F. for a sufficiently extended time to effect the desired extraction concentration. Typically, a suitable cold extraction time is around 12 to 24 hours. During such cold extraction, the admixture may be stirred, agitated or the like for promoting the desired characteristics. The process water may be filtered or treated as desired, or may used as provided by the attendant utility. As will be appreciated, the ratio of coffee beans to water will vary in well known manners dependent on the end product desired. After extraction the concentrate is passed through a straining filter for removing particulate material exceeding a predetermined size. In view of the subsequent thermal processing, microbial filtering does not need to be employed.

After filtering, the concentrate may be diluted and/or placed in suitable containers, a holding tank or the like, and refrigerated prior to thermal processing. Alternatively, the concentrate may be directly transferred for thermal processing using conventional ultra-high temperature processing equipment. Either a direct or indirect process may be employed. In the direct process the concentrate is transferred to a reservoir and steam injected to rapidly heat the concentrate with high thermal efficiency. However, the condensed steam significantly dilutes the resultant product requiring either a subsequent evaporation step or increasing the initial concentration, both of which require additional time and equipment. It is preferred for the coffee concentrate of the present invention to use the indirect method. Therein the concentrate is routed through a tubular coil in a heat exchanger and exposed to superheated steam. While providing lower thermal efficiency, dilution is avoided such that the desired concentration remains stable.

In either process, the concentrate is exposed under pressure for a controlled time and temperature. Excessive time and temperature adversely affects flavor characteristics. Insufficient time and temperature provides insufficient microbial control. Inasmuch as such conditions are interrelated, the $F_0$ index is customarily used to characterize the desired process conditions. As those skilled in the art well know, the $F_0$ index represents time equivalent for a processing temperature of 250° F. at a Z-value of 18° F. In the present invention, it has been determined that extended shelf stability with accompanying flavor characteristic retention can be provided with an $F_0$ index in the range of 1.0 to about 10.0, a range of about 1.5 to 8.0 being preferred, and highly satisfactory results obtained in the range of 2.0 to 6.0. Pressures preferably are in the range sufficient to prevent vapor flashing during transit under turbulent flow.

Immediately subsequent to thermal processing the heated concentrate is cooled in a heat exchanger rapidly below about 180° F. and preferably to ambient temperatures. Following cooling, the concentrate passes through a conventional aseptic filling operation wherein the concentrate is filled and sealed in appropriate containers for the end product. The resultant product may be package for direct use as espresso, caffe latte, iced coffee, cappuccino and other hot and cold coffee beverages based on such a concentrated product. The concentrate may also be diluted with heated water to provide ordinary coffee consumables. Regardless of the end format, the concentrate may be stored at ambient temperatures for extended time periods without experiencing diminution in flavor.

The foregoing attributes are illustrated by the following examples.

EXAMPLE 1

Preparation of Coffee Concentrate

To an open sanitized reservoir provided with a gravity flow filter, 16 ounces of coarse ground, dark roast Arabica coffee was admixed with 72 ounces of tap water in an ambient environment at 70° F. The admixture was stirred lightly and covered. After 14 hours, the coffee extract was drained through the filter and transferred to a holding container at ambient temperature.

EXAMPLE 2

Effect of Direct Heating on Coffee Concentrate

Coffee concentrate prepared in accordance with Example 1 was heated to a slow boil for about 2 minutes and cooled to room temperature. Taste comparisons between the unheated concentrate and the boiled concentrate indicated the latter had an unpleasant acidity, lesser aroma, reduction in body and increased bitterness indicative of thermal erosion of attributes. Similar reactions were reported when both concentrates were diluted with 3 parts water for regular coffee.

EXAMPLE 3

Effect of High $F_0$ Values

Coffee concentrate prepared in accordance with Example 1 were thermally processed in an indirect mode for 15 seconds at temperatures in the range of 270° F. to 290° F. producing $F_0$ values in excess of 12. Taste tasting indicated that fresh and stored concentrate all possessed unacceptable taste characteristics.

EXAMPLE 4

Extended Testing

Coffee concentrate was thermal processed in an indirect processor for at temperatures, times and $F_0$ values as set forth in Table A below:

TABLE

| Sample | Temp (F0)- | Time (sec) | $F_0$ |
|---|---|---|---|
| A | 275 | 4 | 1.4 |
| B | 280 | 4 | 2.7 |
| C | 275 | 7.2 | 2.5 |
| D | 280 | 7.2 | 4.8 |

Following processing and aseptic packaging, the samples were maintained at ambient storage temperatures until consumption.

The above samples were compared with the control concentrate of Example 1. Shortly after preparation, all samples, cold or diluted to regular coffee, possessed favorable flavor characteristics in comparable to control. After 30 days, all samples, cold or diluted to regular coffee, possessed favorable flavor characteristics in comparison with control. No degradation of the type commonly associated with room temperature microbial deterioration was observed. After 60 days, all samples, cold or diluted to regular coffee, still possessed favorable flavor characteristics without noticeable degradation attendant to room temperature storage. All sample retained aromatic qualities without the acidity normally associated with room temperature, non-aseptic storage. Further, over the course of the test, no bitterness was reported as experienced rapidly by non-treated concentrate. Throughout the course of the test, samples B and C were preferred for overall taste. Sample D was generally preferred over Sample A. At no point during the test were any samples rejected on the basis of objectionable characteristics.

Accordingly it appears that coffee concentrate extracted in the cold temperature process described above and heat process in accordance with controlled ultra-high temperatures and times provide an unexpected ambient storage shelf stability, when the $F_0$ values range between 1.0 and 12.0, generally between 1.0 and 8.0, and preferably between about 1.5 to 6.0.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A coffee product shelf stable for extended periods at ambient temperatures comprising: an aseptic package containing a concentrated mixture solely consisting of coffee and water, said mixture being obtained through a cold extraction process conducted at about ambient temperature or below and processed under ultra high temperature conditions having an $F_0$ value in the range of about 1.0 to 12.0.

2. The coffee product as recited in claim 1 wherein said $F_0$ value is in the range of about 1.0 to 8.0.

3. The coffee product as recited in claim 2 wherein said $F_0$ value is in the range of about 1.5 to 6.0.

4. The coffee product as recited in claim 2 wherein said $F_0$ value is in the range of about 2.0 to 5.0.

5. A coffee product having an extended shelf life without additives comprising: a concentrated liquid extract solely of coffee and water conducted at about ambient temperature or below and then processed under temperature and time conditions having an $F_0$ value in the range of about 1.0 to 12.0.

6. The coffee product as recited in claim 5 wherein said liquid extract is obtained under low temperature processing conditions.

7. The coffee product as recited in claim 5 wherein said $F_0$ value is in the range of about 1.0 to 6.0.

8. The coffee product as recited in claim 5 wherein said $F_0$ value is in the range of about 2.0 to 5.0.

* * * * *